United States Patent [19]

Takiguchi et al.

[11] Patent Number: 4,921,728

[45] Date of Patent: May 1, 1990

[54] PROCESS OF MAKING A LIQUID CRYSTAL ELEMENT

[75] Inventors: Yasuyuki Takiguchi, Kawasaki; Akihiko Kanemoto, Yokohama; Kiyohiro Uehara; Yoshio Imai, both of Tokyo; Taro Hino, Yokohama; Mitsumasa Iwamoto, Tokyo; Masaaki Kakimoto, Yokohama; Masaaki Suzuki, Tokyo, all of Japan

[73] Assignee: Ricoh Company, Ltd., Tokyo, Japan

[21] Appl. No.: 399,335

[22] Filed: Aug. 28, 1989

Related U.S. Application Data

[62] Division of Ser. No. 86,782, Aug. 19, 1987, abandoned.

[30] Foreign Application Priority Data

Aug. 22, 1986 [JP] Japan ................................. 61-196531
Mar. 31, 1987 [JP] Japan ................................. 62-78893

[51] Int. Cl.$^5$ ................................................. B05D 5/12
[52] U.S. Cl. ................................. 427/58; 427/430.1; 427/331
[58] Field of Search ...................... 427/58, 430.1, 331; 428/1; 350/341, 340

[56] References Cited

U.S. PATENT DOCUMENTS

| | | | |
|---|---|---|---|
| 3,941,901 | 3/1976 | Harsch | 350/341 |
| 3,961,843 | 6/1976 | Nakamura et al. | 350/341 |
| 3,994,567 | 11/1976 | Matsuo et al. | 350/341 |
| 4,561,726 | 12/1985 | Goodby et al. | 350/341 |
| 4,590,103 | 5/1986 | Ahne et al. | |
| 4,647,478 | 3/1987 | Formanek et al. | |
| 4,721,367 | 1/1988 | Yoshinaga et al. | 428/1 |

FOREIGN PATENT DOCUMENTS

| | | |
|---|---|---|
| 156973 | 10/1985 | European Pat. Off. |
| 2809335 | 9/1978 | Fed. Rep. of Germany |
| 3027571 | 2/1982 | Fed. Rep. of Germany |
| 3107633 | 9/1982 | Fed. Rep. of Germany |

OTHER PUBLICATIONS

"97:641981 Liquid-Crystal Indicator Optical Display Device Orienting and Polarizing Layer", by Krueger et al, 74-Radiation Chem. Photochem., vol. 97, 1982.

Primary Examiner—Bernard Pianalto
Attorney, Agent, or Firm—Oblon, Spivak, McClelland, Maier & Neustadt

[57] ABSTRACT

A liquid crystal element comprising opposed substrates, a liquid crystal nipped between said opposed substrates, and an aligning film formed on the surface of at least one of said substrates to effect substantially horizontal alignment of the liquid crystal molecules relative to said surface, which liquid crystal element is characterized by the fact that the molecules forming said aligning film are substantially aligned in themselves.

4 Claims, 1 Drawing Sheet

Direction in which the substrate was pulled up (Analyser)

(Polarizer)

PROCESS OF MAKING A LIQUID CRYSTAL ELEMENT

This application is a Division of application Ser. No. 07/086,782, filed on Aug. 19, 1987, now abandoned.

DETAILED DESCRIPTION OF THE INVENTION:

Figure 1:
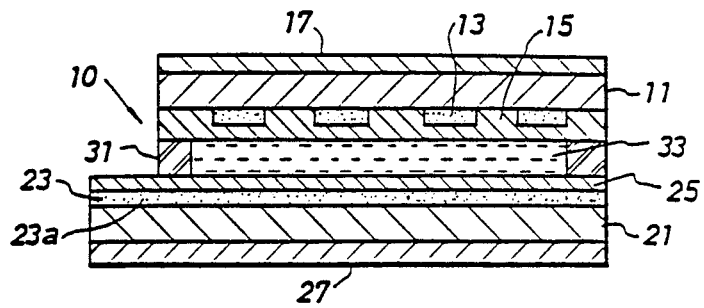

This invention relates to a liquid crystal element comprising opposed substrates, a liquid crystal nipped between said opposed substrates, and an aligning film formed on the surface of at least one of said substrates to align the liquid crystal molecules substantially horizontally relative to said surface, which liquid crystal element is characterized by the fact that the molecules forming said aligning film are substantially aligned in themselves, and to improvements in and concerning the aligning film, the substrate provided with the aligning film, and/or the liquid crystal to be used in the basic liquid crystal element mentioned above.

The liquid crystal element of the present invention can be used as liquid crystal light switching elements such as liquid crystal display elements, liquid crystal light bulbs, and liquid crystal shutters, making use of the electro-optical effect of liquid crystal.

PART I

Now, the basic liquid crystal element contemplated by this invention will be described first.

Liquid crystal switching elements such as liquid crystal display elements, liquid crystal shutters, liquid crystal light bulbs, and optical data processor switching elements, which make use of the electrooptical effect of liquid crystal, generally require the liquid crystal to be aligned preferentially in one direction. Since the treatment for this alignment has a profound effect on the quality of such liquid crystal switching elements, numerous studies are being devoted to development of new methods for effecting this treatment. The states of alignment of liquid crystal on the surface of a substrate are broadly divided into the two category, i.e., the homogeneous alignment having the liquid crystal aligned parallelly to the surface of the substrate and the homeotropic alignment having the liquid crystal aligned perpendicularly to the surface of the substrate.

The actual light switching resides in effecting the ON-OFF switching of light by applying electric field or heat to the liquid crystal aligned as described above thereby causing a variation in the state of alignment of liquid crystal and consequently inducing an alteration in birefringence, optical rotatory power, light scattering and the like.

The liquid crystal elements of the present invention are produced by a novel method for the homogeneous alignment of liquid crystal.

As means for causing liquid crystal molecules to assume the homogeneous alignment, the following methods have been known.
(1) A method of the oblique evaporation of an inorganic compound such as SiO, $SiO_2$, or Au.
(2) A method which comprises applying a silane coupling agent to the surface of a substrate and rubbing the applied layer in one direction with a cotton cloth or the like.
(3) A method which comprises subjecting an applied layer of an organic macromolecular substance such as nylon to a rubbing treatment.
(4) A method which comprises rubbing an applied layer of polyimide.

The oblique evaporation, however, suffers from poor productivity because it constitutes a batchwise treatment and even one batch of treatment consumes much time. This treatment gives rise to a difference in performance of alignment, depending on the particular kind of liquid crystals, and entails heavy selectivity for liquid crystal.

The method which resorts to use of a silane coupling agent has a disadvantage that the capacity of the layer to align liquid crystal is degraded or completely lost by the heating involved during the manufacture of a display element such as, for example, the heating used in curing an adhesive agent in the peripheral seal serving to enclose the liquid crystal and said layer is deteriorated by aging during the preservation thereof at ambient high temperature.

A coating made of a macromolecular substance such as nylon similarly has poor resistance to heat and suffers from degradation of the capacity thereof for alignment.

The method which consists in rubbing a polyimide film has the following drawbacks, though it sparingly suffers from the drawbacks mentioned above.
(1) Since polyimide is generally insoluble and infusible, a polyimide film is obtained by coating the surface of a substrate with a long-chain alkyl amine salt of polyamic acid, i.e. a precursor of polyimide, in the form of a solution and subsequently heating the applied layer thereby effecting ring closure of said polyamic acid. In this case, since the heating is required to be carried out at an elevated temperature exceeding 300° C., the component members of an element such as, for example, substrates are restricted to a great extent. While substrates made of glass, for example, have no trouble, those made of plastic film are possibly fused, deformed, or decomposed. In the case of a color liquid crystal display element which is provided with a color filter, the dye and the macromolecular binder of which the filter is composed are destined to be deteriorated. In the case of a display element having thin-film transistors and diode arrays formed on the surface of the substrates thereof, the display element is altered in its characteristics.
(2) A polyimide film is used in a thickness of not less than several hundred Angstroms (Å) because it suffers from defective alignment due to lack of uniformity of the film when it has a smaller thickness. As the result, it inevitably assumes a yellowish color peculiar to polyimide so that the element using this film entails deficiency in transmittance when the element is of the transmission type or deficiency in reflectance when it is of the reflection type. When the film is used in a display element, the outward appearance of the display element is spoiled by the color. Further, the process used in the fabrication of liquid crystal elements gains in complexity because polyimide is an insulator such that the polyimide film already deposited must be cut to remove portions thereof covering the electrode terminals or the polyimide solution must be applied only on portions excluding those of the electrodes.
(3) Since the fabrication involves the step of rubbing, the process suffers an increase in the number of steps and the rubbing operation induces release of dust as from the cotton cloth and the like and the consequent decrease in the yield.

The liquid crystal of this invention, as described above, comprises opposed substrates, a liquid crystal nipped between the opposed substrates, and an aligning film formed on the surface of at least one of the substrates to effect substantially horizontal alignment of the liquid crystal molecules relative to the surface, and is characterized by the fact that the molecules forming the aligning film are substantially aligned in themselves.

BRIEF AND DETAILED DESCRIPTION OF THE DRAWINGS

Now, this invention will be described with reference to the accompanying drawings.

FIG. 1 is a cross section illustrating a typical configuration of the liquid crystal element of the present invention, utilized as a TN type light switching element. A liquid crystal cell 10 is formed by disposing the upper substrate 11 and the lower substrate 21 as opposed to each other, sealing the common outer periphery of the opposed substrates with a sealing agent 31, and filling the inner gap with a liquid crystal 33. On the surface of the lower substrate 21 is disposed a transparent electrode 23. An aligning film 25 is formed on the surface of the electrode. A transparent electrode 13 is formed on the opposite surface of the upper substrate 11 and an aligning film 15 is formed on the transparent electrode.

The aligning films 15, 25 have their own molecules substantially aligned and, as the result, the liquid crystal molecules are caused to be aligned in the horizontal direction relative to the aligning films 15, 25. As an aligning film of this description, for example, a monolayer or a built-up film obtained by Langmuir-Blodgett's technique or a film formed mainly of a polymeric liquid crystal can be used. These layer and films will be described more fully later on.

Owing to the use of an aligning film in which the molecules forming the aligning film are aligned in themselves, this invention requires no use of the rubbing treatment and permits prevention of the otherwise inevitable occurrence of dust due to the action of rubbing. Because of the small thickness of the cell gap, the present invention realizes enhancement of the quality of display and improvement of yield even in the case of a ferroelectric liquid crystal which by nature is susceptible of the influence of dust. Heretofore, the difficulty experienced in the uniformization of the load exerted during the course of the rubbing treatment has hindered any effort to add to the area of the display cell. In contrast, the present invention has no use of the rubbing treatment and, therefore, permits easy addition to the area of the display cell.

PART II

Secondly, as the first modification of the basic liquid crystal element of the foregoing description, a modification in the aligning film will be described below. This modification in the aligning film resides in (a) the fact that the aligning film in the basic liquid crystal element is a monolayer or a built-up film formed by the Langmuir-Brodgett's technique, (b) the fact that the monolayer or built-up film mentioned above are formed of a macromolecular substance, and (c) the fact that the macromolecular substance mentioned above is polyimide.

It is generally known that a monolayer or a built-up film can be formed by Langmuir-Brodgett's technique. In accordance with this technique, there is obtained a thin film which exhibits structural regularity in the direction perpendicular to the substrate. When a monolayer of a macromolecular substance is formed by further causing the main chains of the molecules to be aligned in a single direction, the produced thin film can be used as an aligning film for liquid crystal as described above because it has regularity both in the direction perpendicular thereto and the direction of the surface thereof.

The Langmuir-Brodgett's technique itself has been already known to the art. In greater details, if a solution of an amphipathic substance, especially an amphipathic macromolecular substance, is spread on a subphase such as water, the monomolecular film of the substance is aligned with the hydrophilic moiety of the molecules directed toward the subphase. For example, when a long-chain alkyl amine salt of a polyamic acid is used as an amphipathic substance, the main chains of the molecules thereof are directed toward the subphase, as will be described more fully later on. Desired deposition on the substrate surface of the monomolecular film of a macromolecular substance is accomplished by forming a partition on the surface of the subphase to limit the spreading area for the molecules, allowing the molecules to spread to the prescribed surface area, disposing a substrate perpendicularly to the subphase, and moving the substrate up and down while allowing it to pass across the surface of the subphase thereby transferring the film onto the substrate.

Substances, especially macromolecular substances of which a monolayer or a built-up film is to be formed are required to possess an amphipathic structure. As examples of the substance of the foregoing description, there can be cited long-chain alkyl amine salts of polyamic acids (precursors of polyimide, polyetherimide, polyamideimide, polyesterimide, and polyimide isoindoloquinazolinedione and the like); long-chain alkyl esters, long-chain alkyl amides and long-chain alkyl ammonium salts of polyacrylic acid polymers such as polyacrylic acid and polymethacrylic acid; long-chain alkyl amine salts of hydrates of maleic anhydride copolymers; partial long-chain fatty acid esters of polyvinyl alcohol; and the like.

Among amphipathic macromolecular substances enumerated above, long-chain alkyl amine salts of polyamic acids have proved to be highly suitable when the film is intended to provide horizontal alignment of liquid crystal. This is because a long-chain alkyl amine salt of polyamic acid has a salient advantage that it will produce a stable film having an excellent resistance to heat when it is deprived of the long-chain alkyl amine and converted into a corresponding polyimide by an aftertreatment. Polyimide films will be more fully described later on.

Use of a monomolecular film or a built-up film of a macromolecular substance formed by the submodifications (a) and (b) as an aligning film for a liquid crystal element, e.g., liquid crystal cell is accomplished by a simple procedure comprising the steps of forming the aforementioned monomolecular film or built-up film of the substance, especially the macromolecular substance on at least one of the substrates being used for a liquid crystal cell such as a glass or plastic substrate having a transparent conductive film superposed thereon, a substrate having a color filter superposed thereon, or a substrate having a thin-film transistor superposed thereon, then applying the substrate to the opposite substrate through the medium of a spacer or the like by the conventional method, and injecting a given liquid crystal into the space intervening the opposed substrates. It is self-evident that in this case, the treatment for alignment of liquid crystal on the opposite substrate side is not always required to rely on such monomolecular film or a built-up film of a macromolecular substance as described above.

It is very obvious that a basic liquid crystal element of this invention but modified by the submodifications (a) and (b) can take the same structure as that exemplified by FIG. 1. In this case, the aligning films 15 and 25 are each a monolayer or a built-up film formed by Langmuir-Brodgett's technique.

The film, especially of a macromolecular substance, obtained by these submodifications possesses an ability to align liquid crystal molecules substantially horizontally (homogenously) relative to the underlying substrate. It also possesses an ability to effect uniaxial alignment of the liquid crystal molecules preferentially in the direction perpendicular to the direction in which the relevant substrate is pulled up during the manufacture of the film by Langmuir-Brodgett's technique, and that without requiring any extra treatment such as, for example, the rubbing treatment. For example, in the case of the twisted nematic mode which is currently used extensively in liquid crystal display elements, it suffices to produce a liquid crystal display element in such a manner that the directions in which the upper and lower substrates are pulled up will perpendicularly intersect each other.

The aligning film, especially of a macromolecular substance, obtained by the submodifications is capable of aligning nematic liquid crystal (optionally including cholesteric liquid crystal), cholesteric liquid crystal, smectic A liquid crystal, smectic G* liquid crystal, smectic H* liquid crystal, smectic C* liquid crystal, and smectic C liquid crystal, for example.

As examples of the operating modes of liquid crystal which can be realized by the use of the aligning film according to the submodifications, there can be cited the operating modes which make use of the electrooptical effect of electric field or current control, such as the twisted nematic (TN) mode, the dynamic scattering mode (DSM), the cholesteric nematic phase change mode, the electrically controlled birefringence mode, and the guest-host mode, the operating modes which make use of the thermooptical effect due to variations in scattering or refractance by heat, and the operating modes which make use of the electrothermooptical effect serving to control scattering and refractance through the agency of both electric field and heat. In these display modes, substrates having a color filter formed thereon, substrates having a thin-film transistor formed thereon, substrates having a nonlinear element such as metal-insulating film-metal (MIM) element, and the like can be used. In any of these display modes, since substantially no thermal hysteresis is caused during the fabrication of the aligning film, the method of the submodifications can be carried out particularly effectively without adversely affecting the quality and performance of the substrates being used.

For the film to function effectively as an aligning film for liquid crystal, the number of monolayers to be build up or superposed is desired to fall in the range of 1 to 500, preferably 1 to 300, and more preferably 2 to 100. Since the thickness of the component monolayer varies in the range of 2.5 Å to 6 Å with the kind of substances used for films, the aforementioned range corresponds in film thickness to 2.5 Å~6 Å to 750 Å~1,800 Å.

The desirability of the aligning film decreases in proportion as the film thickness increases because an increase in film thickness is liable to induce disturbance in the uniaxiality of the alignment of liquid crystal. In the case of colored film such as those made of polymide, increase in thickness is also undesirable because it promotes coloration of the aligning film.

No matter whether the aligning film is formed of a monolayer or even of a built-up film, the ability of the aligning film to align the liquid crystal molecules is highly satisfactory. Thus, the aligning film can be produced in an extremely small thickness by the submodifications as compared with the thickness of the polyimide film (some hundreds to 2,000 Å) obtained by the conventional spin coating method or printing method. The submodifications, therefore, can provide a liquid crystal switching element which enjoys high transmittance in the OFF state when the element is used in a transmission type or high reflectance when the element is used in a reflection type, because of no coloration.

When a thin film, especially of a macromolecular substance, is produced as described above, extra steps such as heretofore practised in partially limiting the application of the aligning film or cutting the deposited aligning film for removal of the portions used for drawing out the electrodes can be omitted because substantially all the driving voltage is applied to the layer of liquid crystal even if the aligning film 25 is an insulating film in the portion 23a for drawing out an electrode as illustrated in FIG. 1. Thus, the method of this invention modified by the submodifications enjoys very high productivity.

The method resorting to oblique evaporation of an inorganic substance such as SiO has been unable to effect oblique evaporation with uniform evaporation angle and uniform film thickness on a substrate of a large surface area. In the case of an aligning film of polyimide produced by the conventional coating - rubbing, it is difficult to obtain a uniformly applied layer throughout a large surface area and it is likewise difficult for the load exerted during the rubbing to be uniformly distributed throughout the entire surface. These difficulties have posed a hindrance to an effort to produce a liquid crystal cell in a larger surface area. In contrast, the aligning film according to the present modifications permits the treatment of a large surface area to be easily carried out uniformly and suits the manufacture of a display element of a large surface area.

Further, the method for the aligning treatment is simplified in process according to the submodifications because it has no use for the work of rubbing and is enabled to enhance the yield because it has no possibility of inducing generation of dust during the work of rubbing.

Now, the basic liquid crystal element of this invention but modified by the submodifications (a) and (b) and further modified by the submodification, i.e., a liquid crystal element whose aligning film is a monolayer or a built-up film formed by Langmuir-Brodgett's technique and is made especially of polyimide selected from macromolecular substances will be described.

The present submodification is aimed at providing a liquid crystal element which has no selectivity for liquid crystal, offers high resistance to heat, assumes a color only sparingly, and exhibits a highly satisfactory capacity for alignment in the absence, or even in the presence, of the rubbing treatment.

The modified liquid crystal element concerns, for example, a liquid crystal cell comprising opposed substrates, a liquid crystal sealed in the gap interposed between the substrates, and an aligning film formed on the surface of at least one of the substrates and adapted to effect horizontal alignment of liquid crystal molecules, which liquid crystal cell is characterized by the fact that the aligning film is made of a monolayer or a built-up film of polyimide formed by Langmuir-Brodgett's technique.

The method for producing the modified liquid crystal display cell effects manufacture of a liquid crystal cell according to the submodification (c) by the formation of an aligning film on the surface of a substrate, for example, by steps of causing polyamic acid to react with a hydrophobic long-chain alkyl amine compound thereby producing a polyamic acid derivative (amine salt); of spreading the aforementioned polyamide acid derivative on the subphase thereby forming a monolayer of the derivative; of causing the monolayer of the polyamic acid derivative to adhere to the surface of the substrate for a liquid crystal cell; and of allowing the polyamic acid derivative, on the surface of the substrate, to be dehydrated and cyclized and consequently converted to an aligning film of polyimide.

Naturally, the modified liquid crystal cell under discussion can assume the same structure as that of the exemplified structure illustrated in FIG. 1. In this case, the aligning films 15 and 25 are each made of a monolayer or a built-up film of polyimide formed through Langmuir-Brodgett's technique.

This polyimide film is formed, for example, by the following method. First, a long-chain alkyl amine (4) is added to a solution of polyamic acid (3) synthesized from a tetracarboxylic acid dianhydride (1) and a diamine (2) to effect synthesis of an alkyl amine salt of polyamic acid (5). This alkyl amine salt of polyamic acid is converted by heat or with an acid anhydride into a polyimide (6).

3,4,3',4'-biphenyltetracarboxylic dianhydride, 2,3,2',3'-biphenyltetracarboxylic dianhydride, bis-(3,4-dicarboxyphenyl)-methane dianhydride, bis-(3,4-dicarboxyphenyl)-ether dianhydride, bis-(3,4-dicarboxyphenyl)-sulfone dianhydride, 2,2-bis-(3,4-carboxyphenyl)-propane dianhydride, 3,4,3',4'-benzophenonetetracarboxylic dianhydride, butanetetracarboxylic dianhydride, 1,2,5,6-naphthalenetetracarboxylic anhydride, thiophene-2,3,4,5-tetracarboxylic anhydride, perylene-3,4,9,10-tetracarboxylic anhydride, and ethylenetetracarboxylic anhydride.

As examples of the diamines advantageously usable herein, there can be cited metaphenylenediamine, paraphenylenediamine, 3,3'-diaminobiphenyl, 4,4'-cyanoaminobiphenyl, 4,4'-diaminobiphenyl, 3,3'-methylenedianiline, 4,4'-methylenedianiline, 4,4'-ethylenedianiline, 4,4'-isopropylidenedianiline, 3,3'-oxydianiline, 4,4'-oxydianiline, 3,4'-oxydianiline, 3,3'-thiodianiline, 4,4'-thiodianiline, 3,3'-carbonyldianiline, 4,4'-carbonyldianiline, 3,3'-sulfonyldianiline, 4,4'-sulfonedianiline, 1,4-naphthalenediamine, 1,5-naphthalenediamine, 2,4-bis-(4-aminophenyl)-propane, benzidine, 3,3'-dimethylbenzidine, 3,3'-dimethoxybenzidine, 2,4-bis-(β-amino-tert-butyl)-toluene, bis-(4-β-amino-tertbutylphenyl)-ether, 1,4-bis-(2-methyl-4-amine pentyl)-benzene, 1-isopropyl-2,4-phenylenediamine, m-xylylenediamine, p-xylylenediamine, di-(4-aminocyclohexyl)-methane, hexamethylenediamine, 2,2-dimethylpropylenediamine, and 1,4-diaminocyclohexane.

The tetracarboxylic acids and the amines enumerated above can be severally used either singly or in the form of a combination of two or more members.

The polymerization degree, n, is an integer preferably falling in the range of 10 to 500. If is not more than 10, the film is deficient in mechanical strength and in adhe-

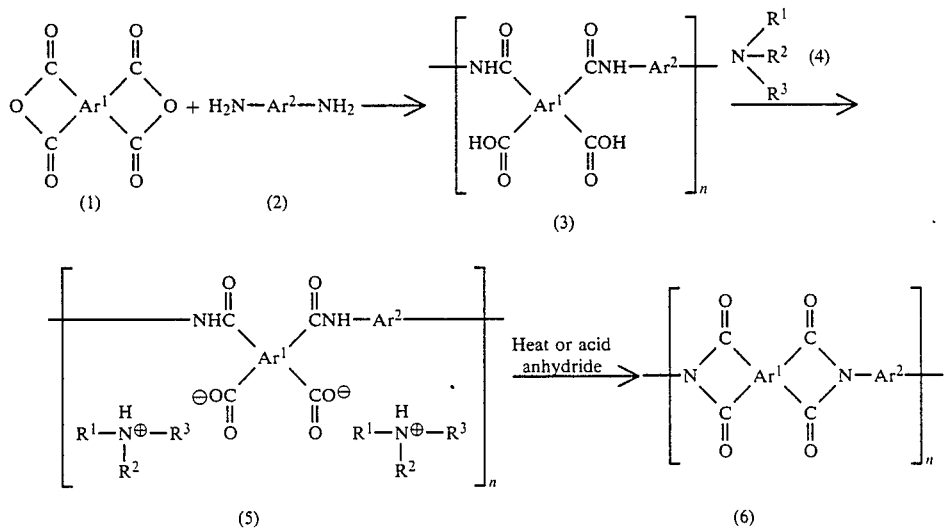

In the foregoing formulae, $Ar^1$ and $Ar^2$ respectively denote the connecting groups to constitute the skeletons, of tetracarboxylic acid dianhydride and diamine, n denotes an integer of at least 1, $R^1$ and $R^2$ independently denote a lower alkyl group or hydrogen atom, and $R^3$ denotes a long-chain alkyl group.

As examples of the tetracarboxylic acid effectively usable in the synthesis of the alkyl amine salt of polyamic acid, there can be cited pyromellitic dianhydride, 2,3,6,7-naphthalenetetracarboxylic dianhydride, siveness to the substrate and interferes with alignment of liquid crystal molecules through readily release into the liquid crystal. If it exceeds 500, the solubility of the polyamic acid is unduly low.

As examples of the long-chain alkyl amines effectively usable herein, there can be cited N,N-dimethyl-n-octylamine, N-methyl-n-octylamine, N,N-dimethyl-n-decylamine, N-methyl-n-decylamine, n-decylamine, n-octylamine, N,N-dimethyl-n-dodecylamine, N-methyl-n-dodecylamine, n-dodecylamine, N,N-dimethyl-n-tetradecylamine, N-tetradecylamine, N-methyltetradecylamine, N,N-dimethyl-n-hexadecylamine, N-methyl-n-hexadecylamine, n-hexadecylamine, N,N-dimethyl-n-octadecylamine, N-methyl-n-octadecylamine, n-octadecylamine, N,N-dimethylbehenylamine, arachidyllamine, behenylamine, and N,N-dimethylbehenylamine. For the purpose of obtaining a highly desirable Langmuir-Brodgett film and materializing an outstanding capacity for alignment, the number of carbon atoms in the long-chain alkyl group is desired to fall in the range of 8 to 25, preferably 12 to 25.

In due respect to the ability to form a film on the surface of water subphase and the ability to align liquid crystal, the amounts of the long-chain alkyl amine to be used is desired to fall in the range of 0.5 to 4 equivalent weights, based on the repeating unit of polyamic acid.

As examples of the solvents effectively usable in the formation of the aforementioned alkylamine salt of polyamic acid, there can be cited N,N-dimethylformamide, N,N-diemthylacetamide, N-methyl-2-pyrrolidone, dimethyl sulfoxide, tetramethylenesulfone, cresol, and phenol. Optionally, something like benzene may be incorporated for the improvement of solubility.

The alkylamine salts of polyamic acid produced as described above comprises amphipathic molecules which possess a hydrophobic alkyl group and a hydrophilic carboxylic acid amine salt therein and, therefore, is enabled to form a monomolecular film by Langmuir-Brodgett's technique developed by Langmuir. Now, the production of this particular film will be described specifically below. When a solution of the alkylamine salt of polyamic acid is developed on the surface of water, the molecules of the salt are aligned with the main chains thereof directed toward the water surface. When a partition is disposed on the surface of water to decrease the area of development, the molecules developed on the water surface form a so-called solid membrane which is a liquid inflation membrane or a two-dimensional solid. By immersing a substrate for a liquid crystal cell vertically in the water tank with the surface pressure in the existing state being kept, and moving the immersed substrate up and down, monomolecular films of the alkyl amine salt of polyamic acid are transferred one at a time onto the surface of the substrate. The method for effecting the transfer of monomolecular films to the substrate is not restricted to that which has just described. Alternately, there may be adopted the rotary cylinder method which comprises setting a substrate on a cylindrical carrier and rotating the carrier on the surface of water. Optionally, the substrate may be subjected to a pretreatment for improving the wettability thereof.

The monomolecular film or a built-up film of the alkylamine salt of polyamic acid obtained as described above exhibits uniaxial alignment, i.e., the phenomenon in which the main chains of the molecules of the micromolecular substance are aligned in the direction in which the substrate has been pulled up during the production of the film.

Then, by immersing the substrate in an acid anhydride such as acetic anhydride, propionic anhydride, or butyric anhydride or by heating the substrate, the amine salt is dehydrated and cyclized and, at the same time, the amine containing the long-chain alkyl group is liberated to give rise to a polyimide (6). In this case, since the cyclization by heating requires an elevated temperature of about 200° C. and, moreover, impairs the ability of the polyimide to induce alignment, the method resorting to use of an acid anhydride proves to be preferable. In this case, the reaction involved is promoted by addition of a tertiary amine such as triethylamine or pyridine. The reaction system used for this method may incorporate therein a solvent when occasion demands. Solvents capable of dissolving polyamic acid cannot be used in this case. A temperature approximately in the range of 20° to 60° C. suffices for the cyclization with an acid anhydride. In the acetic anhydride-pyridine-benzene (1:1:3) system, for example, the treatment can be carried out at very low temperatures because the reaction is completed in several hours at normal room temperature and in about one hour at 40° C.

It has been confirmed by observation under an electron microscope that the monomolecular film or the built-up film of polyimide obtained as described above form an exceptionally uniform film. Further, unlike the conventional monomolecular film or built-up film possessing a long-chain alkyl group such as of a long-chain fatty acids, the countertype film according to the submodification (c) of this invention releases the long-chain alkyl group thereof after the molding of film and, therefore, exhibits the high resistance to heat inherent in the polyimide, shows no chemical or physical alteration even at temperatures in the range of 200° to 350° C., and forms a suitable coating for use as an aligning film in a liquid crystal cell as in the liquid crystal light switching element.

The monomolecular film or the built-up film of polyimide according to the present submodification (c) has no selectivity for liquid crystal. Examples of liquid crystals for which the film provides required alignment include:

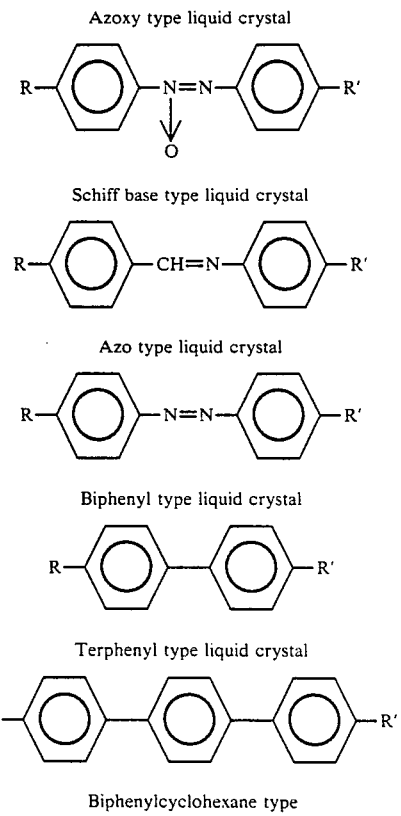

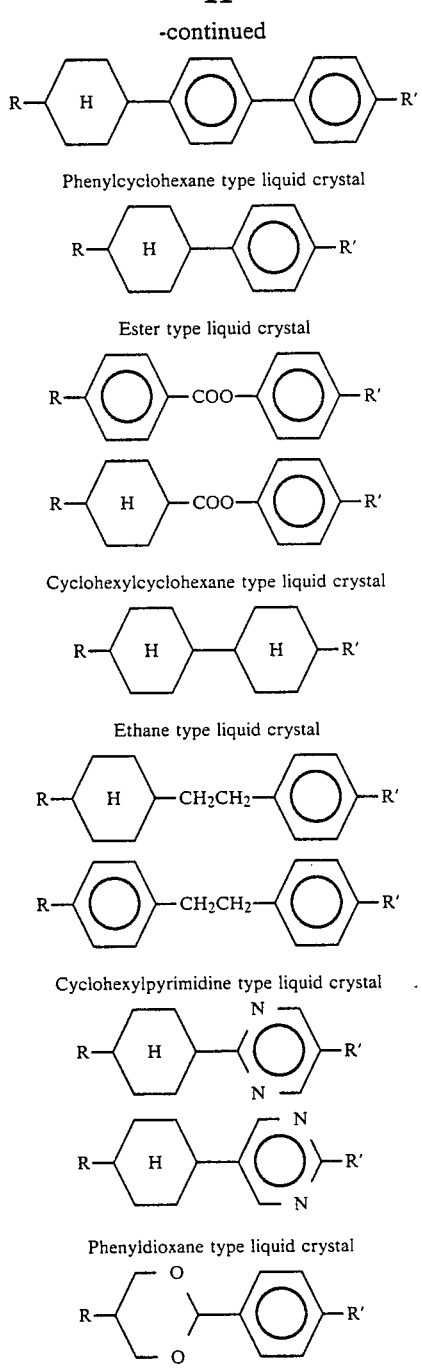

-continued

Phenylcyclohexane type liquid crystal

Ester type liquid crystal

Cyclohexylcyclohexane type liquid crystal

Ethane type liquid crystal

Cyclohexylpyrimidine type liquid crystal

Phenyldioxane type liquid crystal

In the foregoing formulas, R and R' independently denote an alkyl group, an alkoxy group, a cyano group, an alkylaryl group, an alkylcyclohexyl group, an alkoxyaryl group, an alkoxycyclohexyl group, an alkylaryl carboxyl oxy group, an alkylaryloxy carboxyl group, an alkoxyaryl carboxyloxyl group, an alkoxyaryloxy carboxyl group, a fluorine atom, a chlorine atom or the like.

These liquid crystals may contain a dichloric dye or incorporate therein a cholesteric liquid crystal such as, for example, a cholesterol derivative.

The polyimide film according to the present submodification (c) is an aligning film of high reliability which possesses high resistance to heat and experiences no deterioration of its ability to align liquid crystal even in an environment of ambient high temperature or ambient high temperature and ambient high humidity. It also possesses a characteristics property for amply withstanding the heating to be given as in the sealing of the periphery during the manufacture of a liquid crystal cell. It is, therefore, highly suitable for use as an aligning film for liquid crystal.

Now, the present modification will be described below with reference to the electrically controlled birefringence mode and the twisted nematic mode each using glass substrates. It should be noted, however, that the present modification is not restricted to these modes.

EXAMPLE 1:

(1) Formation of aligning film

To a 1 mmol/l solution of polyamic acid synthesized from 3,4,3',4'-biphenyltetracarboxylic diahydride and p-phenylenediamine in a mixed solvent (1:1) of N,N-dimethylacetamide and benzene, a solution of N,N-dimethyl-n-hexadecylamine dissolved in the same concentration in the same solvent as the aforementioned mixed solvent solution was added in two equivalent weights based on the repeating unit of the polyamic acid to prepare a solution of an alkyl amine salt of polyamic acid. This solution was dropped and spread on ionexchanged water held in a water tank and kept at 20° C. and, with the surface pressure kept at 25 dynes/cm by means of a partition disposed in the water tank, a substrate was moved up and down perpendicularly to the surface of the water to form a two-fold built-up film on the substrate. The substrate was a product obtained by vacuum depositing $SiO_2$ in a thickness of 500 Å on a sheet of soda glass and partially superposing ITO (indium-tin oxide) as a display electrode on the $SiO_2$ layer. The substrate was pulled up at a rate of 3 mm/min. When the rate was increased to about 10 cm/min, no appreciable change occurred in the thickness of the film formed or the ability of the formed film to align liquid crystal. Then, the substrate on which the built-up film had been formed was kept immersed in a mixed solution of acetic anhydride-pyridine-benzene (1:1:3) at 20° C. for six hours to effect liberation of the long-chain alkyl group and thorough imidation. The formation of an imide ring was confirmed by an infrared absorption at 1,780 $cm^{-1}$ due to the carbonyl group. Then, the substrate was washed with pure water and dried in a vacuum for removal of the residual water. The polyimide film consequently obtained had an extremely small thickness of 8 Å.

(2) Preparation of cell

Figure 2:
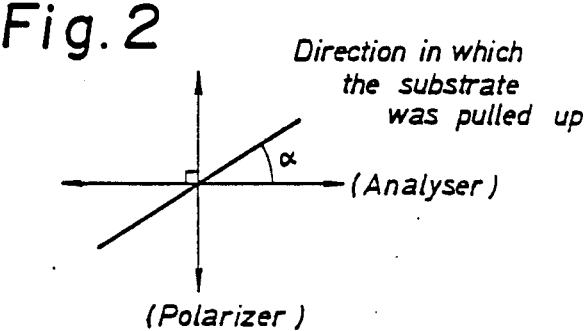
Figure 3:
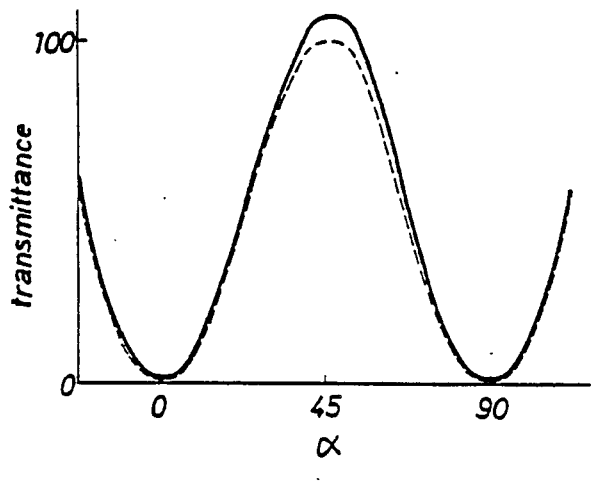

On the outer periphery of the substrate which had undergone the treatment described above, an epoxy type adhesive containing spacer beads of 20 μm in diameter was applied by printing. This substrate and an opposite substrate which had undergone the same treatment for alignment were applied to each other in such a manner that their respective directions of pulling fell antiparallel to each other. The two substrates thus applied to each other were left standing until the adhesive was solidified. Then, a phenylcyclohexane type liquid crystal mixture (produced by Merck & Co. and marketed under product code of "ZLT 1132") was injected into the space between the opposed substrates via a gap formed in advance in the adhesive layer. The gap used for the injection was closed with an epoxy type adhesive. When the cell thus formed was observed under a polarizing microscope, it was confirmed that the liquid crystal was uniaxially aligned on each of the substrates in the direction of pulling. FIG. 2 is a diagram illustrating the relation of the angle, α, of pulling up of the substrate to an analyzer and a polarizer. FIG. 3 shows the transmittance of the cell to white light as the function of the angle, α, formed between the direction of alignment and the analyzer obtained under the condition involving the method of alignment and the combination of the polarizer 27 and the analyzer 17 (FIG. 1) as illustrated in FIG. 2.

The transmittance reported was determined with a scale indicating as 100 the maximum transmittance and 0 the minimum transmittance, both exhibited by a cell produced similarly with substrates on which the same polyamic acid as used in Example 1 was applied by the spin coating method in a thickness of 1,000 Å and the applied layer was fired at 250° C. for one hour for conversion of the polyamic acid into polyimide and the fired layer was rubbed with a cotton cloth for alignment of liquid crystal. It is noted from the results that the polyimide of the present modification shows as great an ability to align liquid crystal as a conventionally rubbed polyimide coating for liquid crystal alignment. Further, it is noted that the aligning film has transmittance about 5% higher than that of the film aligned by rubbing and, therefore, enjoys a bright background. The spin coating method provides a film of 8 Å in thickness only with difficulty. When an attempt was made, therefore, to prepare a cell by forming a film in a thickness of 50 Å by this method and rubbing the formed film, the aligning film was separated from the substrate during the course of rubbing and no desirable alignment could be obtained.

The liquid crystal cell obtained in accordance with the modification mentioned above was tested for electrostatic capacitance with a test signal of 1 KHz 50 mV from an LCR meter produced by Yokokawa Hewlet Packard Co. and marketed under product code of "4262A". By calculation using the results of this test, the dielectric constant of the liquid crystal layer was found to be 4.9. In the light of the fact that the dielectric constant of ZLI-1132 was 14.8 in the direction of the major axis of the molecules and 4.7 in the direction of the minor axis thereof, the value 4.9 evinces that the liquid crystal molecules were aligned substantially horizontally relative to the surface of the substrate.

EXAMPLE 2:

A liquid crystal cell having a liquid crystal layer of 10 μm in thickness was produced by treating substrates for alignment in the same way as in Example 1 and disposing them in such a manner that their respective directions of pulling up intersected each other perpendicularly. This cell assumed the state of colorless transparency when the axis of transmission of the polarizing plates was set parallel to the direction of pulling up (the upper and lower polarizing plates perpendicularly intersecting each other) and a dark black state when the upper and lower polarizing plates were set parallel to each other, indicating the formation of alignment of the twisted nematic mode. The liquid crystal used herein was ZLI-1132. The ability to align liquid crystal was highly satisfactory. Under application of a square wave of 64 Hz, the cell operated with a potential of about 1.8V.

Separately, when a cell was produced by using substrates on which the polyimide film described in Example 1 was deposited in a thickness of 1,000 Å and this cell was set in operating with the polyimide layer unremoved from the portions covering the terminals of the electrodes, the operating voltage was raised to about 2.5V because of contact resistance.

Another cell was produced with the polyimide films which had been formed in the same manner as described above and heated at 150° C. for two hours to test the aligning films of the present modification for reliability in terms of resistance to heat. The ability of the films to align liquid crystal was not different at all from that of the films which had not undergone the heat treatment.

EXAMPLE 3:

A twisted nematic mode liquid crystal display element was produced by following the procedure of Example 2, except that a biphenyl type liquid crystal produced by British Drug House and marketed under product code of "E8" was used instead of "ZLI-1132". The ability of the aligning films to align liquid crystal was equivalent to that of the aligning films of Example 2. The films showed no selectivity for liquid crystal.

EXAMPLE 4:

A parallel alignment type cell was produced by following the procedure of Example 1, except that the number of superposed monomolecular films was increased to 50. Though the transmittance of the cell was slightly inferior to that of the cell using two monomolecular films, the aligning ability of the 50-fold built-up film was not such as to raise any problem from the practical point of view.

EXAMPLES 5-10:

Two-fold built-up films of polyimides were formed by Langmuir-Brodgett's technique using as raw materials polyamic acids synthesized from tetracarboxylic acids and diamines as indicated in the following table. Parallel alignment type cells were produced by using these films and following the procedure of Example 1. The aligning films in all the cells exhibited a highly satisfactory ability to align liquid crystal similarly to those of Example 1.

| Example | Tetracarboxylic acid dianhydride | Diamine | Uniaxial alignment | Resistance to heat |
|---|---|---|---|---|
| 5 | 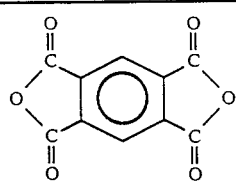 | 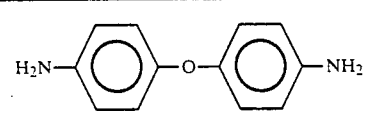 | O | >200° C. |

-continued

| Example | Tetracarboxylic acid dianhydride | Diamine | Uniaxial alignment | Resistance to heat |
|---|---|---|---|---|
| 6 | 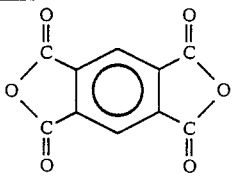 | 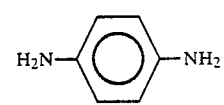 | ○ | >200° C. |
| 7 | 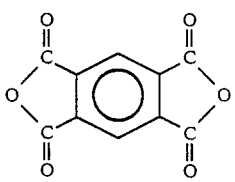 | 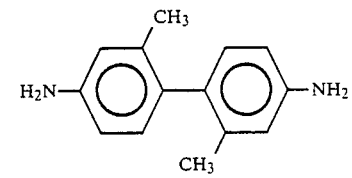 | ○ | >200° C. |
| 8 | 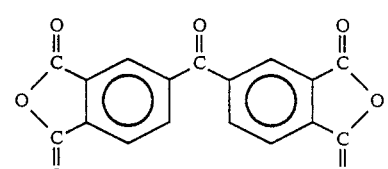 | 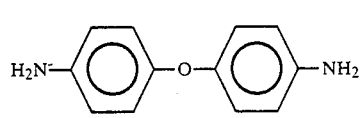 | ○ | >200° C. |
| 9 | 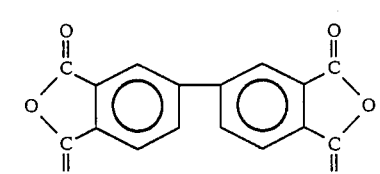 | 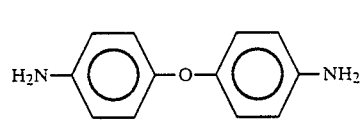 | ○ | >200° C. |
| 10 | 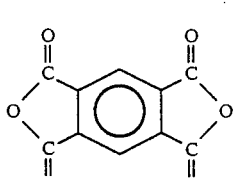 | 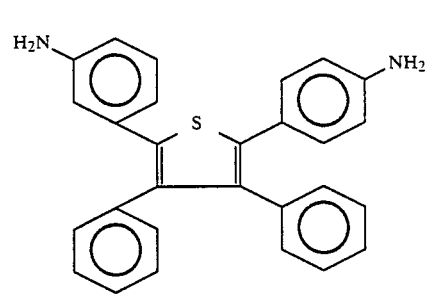 | ○ | >200° C. |

PART III

Thirdly, as the second modification of the basic liquid crystal element of this invention, another modification in the aligning film will be described. This modification resides in the fact that the aligning film is itself made of a macromolecular liquid crystal.

It is self-evident that the liquid crystal element embodying this modification can have the same structure as that of the example illustrated in FIG. 1. In this case, the aligning films 15 and 25 are made of a macromolecular liquid crystal.

The aligning films of the foregoing description can be produced, for example, as follows. With reference to FIG. 1, macromolecular liquid crystal films are formed by the spin coat or dipping method on the substrates 11 and 21 already furnished with transparent electrodes 13 and 23. Then, the deposited macromolecular liquid crystal films, still kept at a temperature enough for the films to assume a liquid crystal phase, are exposed to an electric field or a magnetic field so as to effect alignment of the macromolecular liquid crystal molecules. When the macromolecular liquid crystal is thermotropic, this established alignment of the liquid crystal molecules can be retained even in a solid state by suddenly cooling the substrates. When the macromolecular liquid crystal is lyotropic, the retention of the molecular alignment can be attained by expelling the solvent through distillation.

Production of a liquid crystal cell with the use of substrates provided with macromolecular liquid crystal films as aligning films is attained as follows, for example. A ferroelectric liquid crystal, for example, is nipped between the substrates of the foregoing description. Then the substrates incorporating the liquid crystal are heated to a temperature enough for the ferroelectric liquid crystal to acquire increased flowability and then left gradually cooling to induce alignment of the ferroelectric liquid crystal. The macromolecular liquid crystal to be used as the aligning film, therefore, is required to be capable of remaining in the solid phase at least during the course of the application of heat. Since the grades of ferroelectric liquid crystal currently available in the market for practical use assume their isotropic phase at temperatures in the range of 80° to 100° C., any grade of macromolecular liquid crystal which assumes its solid phase at a temperature higher than the aforementioned range can be used as the aligning films contemplated by the present modification. For the ferroelectric liquid crystal to be aligned, it is not always required to be heated until it assumes its isotropic phase. In many cases, it suffices to continue the heating until the liquid crystal assumes such a phase as the nematic phase or cholesteric phase which exhibits sufficiently high flowability. In this case, even the grade of macromolecular liquid crystal which assumes a solid phase at a temperature lower than the range of 80° to 100° C. can be used. It is provided, however, that any macromolecular liquid crystal which dissolves into the ferroelectric liquid crystal layer cannot be used.

As concrete examples of the macromolecular liquid crystals effectively usable according to the present modification, liquid crystals having repeating units of the following structures can be cited.

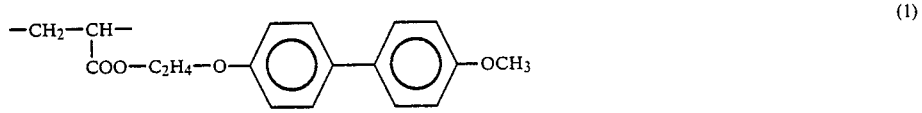
(1)

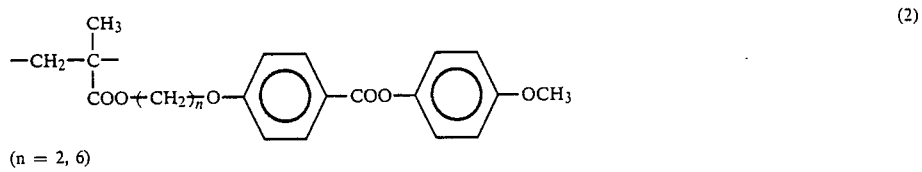
(2)
(n = 2, 6)

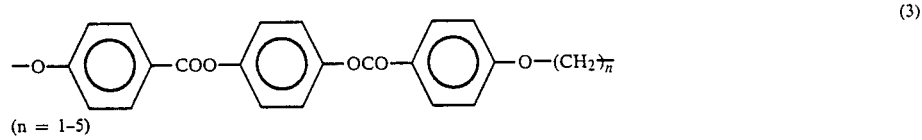
(3)
(n = 1-5)

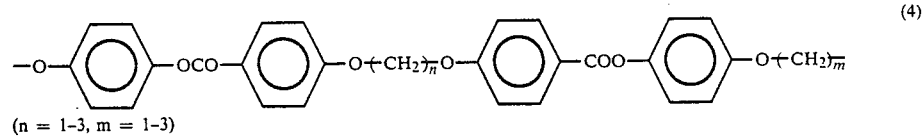
(4)
(n = 1-3, m = 1-3)

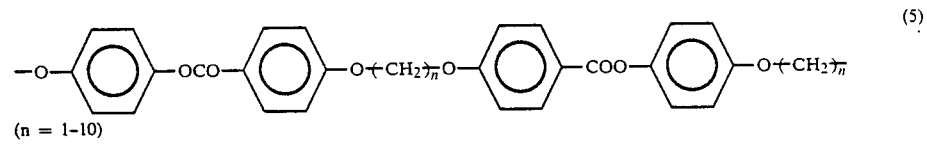
(5)
(n = 1-10)

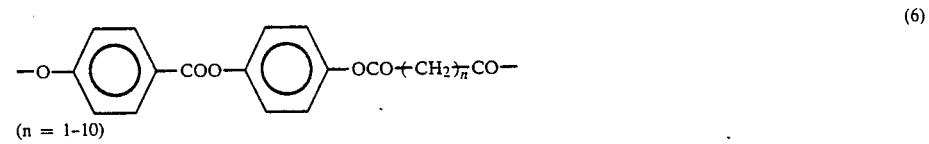
(6)
(n = 1-10)

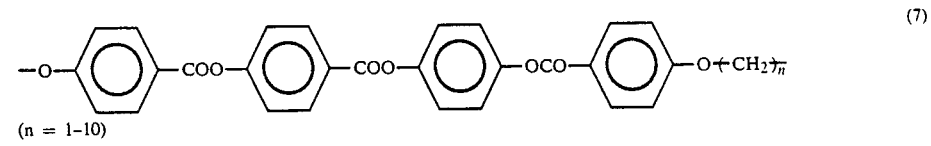
(7)
(n = 1-10)

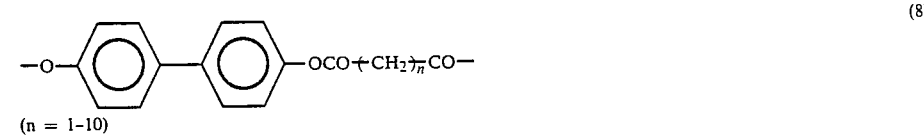
(8)
(n = 1-10)

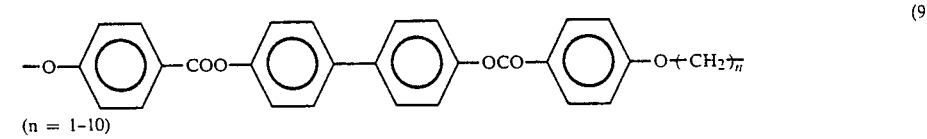
(9)
(n = 1-10)

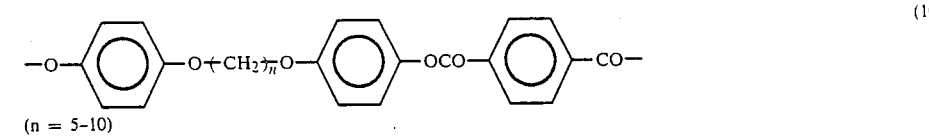
(10)
(n = 5-10)

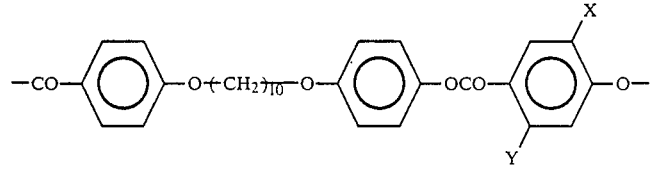

(11)

(X, Y) = (H, H), (H, Cl), (H, CH₃), (H, Br), (Cl, Cl)

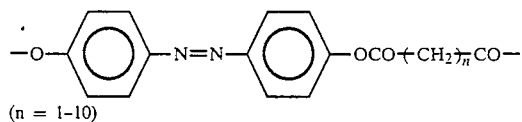

(12)

(n = 1-10)

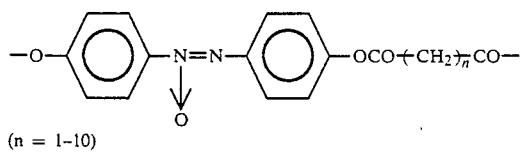

(13)

(n = 1-10)

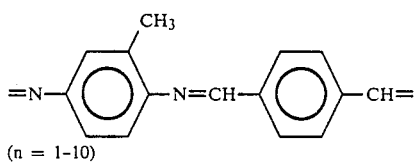

(14)

(n = 1-10)

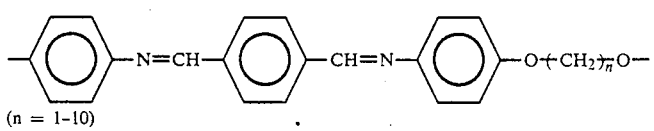

(15)

(n = 1-10)

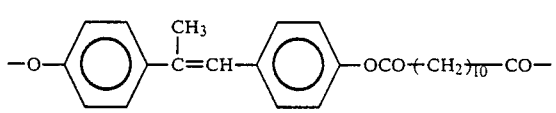

(16)

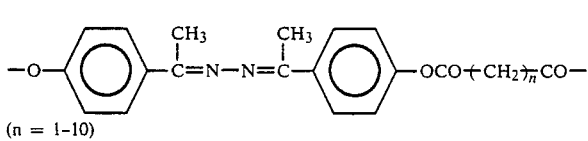

(17)

(n = 1-10)

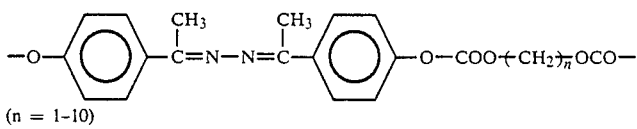

(18)

(n = 1-10)

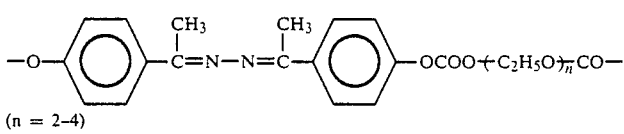

(19)

(n = 2-4)

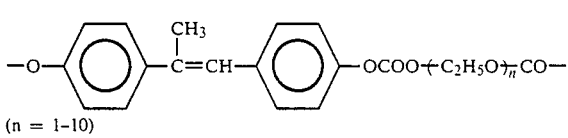

(20)

(n = 1-10)

Macromolecular liquid crystals other than those are mentioned above can be used if they satisfy the above qualifications.

In addition to the aforementioned advantages brought about by the liquid crystal element using aligning films which have the molecules of their own aligned, the present modification permits production of a liquid crystal element of high quality because the macromolecular liquid crystal used therein is colored sparingly as compared with the polyimide which has found extensive utility to date. It also has an advantage that the direction of alignment of the macromolecular liquid crystal can be freely changed by the direction of alignment of the magnetic poles being used for exertion of magnetism.

EXAMPLE 11:

A 1% dimethylformamide solution of a macromolecular liquid crystal having the following structural formula:

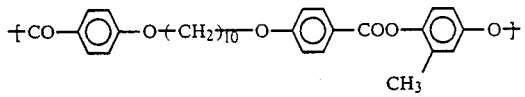

was deposited by the spin coat method on a substrate furnished in advance with a transparent electrode. The substrate and the layer of the solution deposited thereon were heated to expel the solvent by distillation. The macromolecular liquid crystal consequently remaining on the substrate was allowed to assume a nematic phase. A magnetic field of 14,000 gausses was applied to the resultant macromolecular liquid crystal layer. This application was made in the direction perpendicular to the surface of the paper with reference to the bearing shown in FIG. 1. After completion of the alignment of the liquid crystal was confirmed by means of a polarizing plate, the substrate was suddenly cooled. By observation with the polarizing plate, the macromolecular liquid crystal was found to be aligned substantially parallelly to the direction of application of the magnetic field. When a cell similar to the cell obtained in Example 15 to be cited later on was produced by causing two substrates produced as described above to be applied to each other in such a manner that their respective directions of application of magnetic field fel parallel or antiparallel to each other, it was confirmed that the alignment proceeded satisfactorily to confer a stable ability of memory upon the produced cell.

PART IV

Now, as the third modification of the basic liquid crystal element of the present invention, the modification in substrates possessing an aligning film will be described below. The present modification resides in using, in the basic liquid crystal element of this invention or in the liquid crystal element embodying the first or second modifications described above, either hydrophobic substrates or substrates subjected to a treatment for impartation of hydrophobicity as the substrates having an aligning film formed thereon. It is on the surface of these substrates that a monomolecular film or a built-up film of a macromolecular substance are formed as aligning films, e.g., by Langmuir-Brodgett's technique.

As a means of aligning liquid crystal, the formation of a monomolecular film or a built-up film of polyimide by Langmuir-Brodgett's technique has been already described. The film shows an ability to effect uniaxial alignment, a phenomenon that the main chains of the macromolecules are aligned in the direction of pulling up of the relevant substrate, and the liquid crystal molecules are aligned along the main chains just mentioned. When the substrate used is of a hydrophilic type, since the direction of alignment of the main chains of macromolecules is liable to be varied by dust possibly deposited on the substrate or on the built-up film or by the influence of the hydrophilicity of the substrate, there are cases where stable alignment is obtained only with difficulty. In accordance with the present modification, however, the monomolecular film of a macromolecular substance is produced in a stably aligned state.

The present modification contemplates forming a monomolecular film or a built-up film of a macromolecular substance by Langmuir-Brodgett's technique on a specific substrate which is either a hydrophobic substrate or a substrate subjected to a treatment for impartation of hydrophobicity.

Now, the present modification will be described more specifically below.

As already pointed out, Langmuir-Brodgett's technique itself has been known to the art. When the substrate to be used in working this technique happens to be of a hydrophilic type, the produced film is transferred onto the substrate with the main chains of the macromolecules aligned in the direction of the pulling up of the substrate. The monomolecular film and built-up film have the main chains of the macromolecules thereof aligned as described above. These films are used as aligning films for liquid crystal either directly in their unaltered form or, when they are made of the aforementioned long-chain alkylamine salts of polyamic acid, after having undergone a heat treatment of the nature to be described fully later on. If the substrate is of a hydrophilic type, there is a possibility that no stably aligned macromolecular film will be produced owing to defects such as of the substrate.

The inventors have found that, by the use of a hydrophobic substrate or a substrate vested with hydrophobicity, the film has the main chains of the macromolecules thereof aligned in the direction perpendicular to the direction of pulling up and, therefore, acquires a more stabilized ability to effect alignment of liquid crystal.

The hydrophobic substrate to be used is required to possess a contact angle of not less than 20 degrees, preferably not less than 30 degrees, relative to water.

As examples of the hydrophobic substrate usable herein, there can be cited glass sheet having undergone a treatment for impartation of hydrophobicity, a silicone substrate having undergone a treatment for impartation of hydrophobicity, inorganic substrates such as glass substrates possessing a transparent conductive film which has undergone a treatment for impartation of hydrophobicity, sheets of such plastic substances as acrylic resin, polyester, polyimide, polyether sulfone, polysulfone, polycarbonate, cellulose resin, polystyrene, phenol resin, urea resin, and melamine resin, and such plastic substrates having undergone a treatment for impartation of hydrophobicity.

As means for the impartation of hydrophobicity, there may be adopted a treatment with a silane coupling agent, a treatment with a titanium coupling agent, a treatment with an aluminum type coupling agent, or a treatment with a chromium type coupling agent, for example. Alternatively, the impartation of hydrophobicity may be effected by vacuum deposition or application of a resin solution. In the case of a substrate of resin, the treatment can be carried out by surface graft polymerization, exposure to steam, or polymerization of applied monomer.

The treatment with a coupling agent can be carried out by applying the coupling agent to the surface and, when necessary, cleaning and drying the applied layer of the coupling agent. Typical coupling agents usable for the purpose of this treatment are shown below.

SILANE COUPLING AGENTS

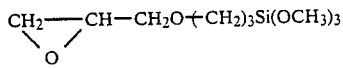

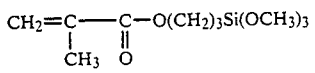

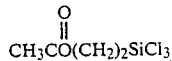

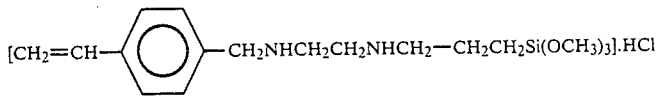

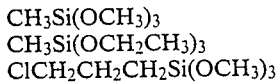

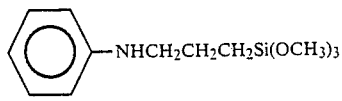

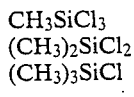

TITANIUM COUPLING AGENTS

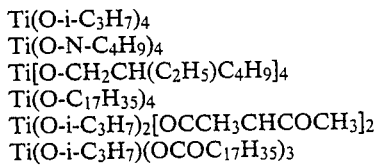

The liquid crystal element, e.g., liquid crystal cell, obtained by the present modification is not different in any sense from the basic liquid crystal element of the present invention or the liquid crystal element embodying the first or second modifications described above, except that a hydrophobic substrate or a substrate having undergone the treatment for impartation of hydrophobicity is to be specifically used as the substrate for a liquid crystal element. Thus, the liquid crystal cell using the substrates of the present modification can of course assume the structure illustrated in FIG. 1. In this structure, the upper substrate 11 and the lower substrate 21 are either hydrophobic substrates or substrates having undergone the treatment for impartation of hydrophobicity.

The hydrophobic substrate or the substrate having undergone the treatment for impartation of hydrophobicity to be used in accordance with the present modification permits the macromolecules to be aligned homogeneously, yields only sparingly to the influence of defects possibly inflicted on the substrate or in the built-up film, and ensures satisfactory alignment of liquid crystal molecules as compared with the hydrophilic substrate.

Further, since the film obtained by the present modification possesses the well-aligned macromolecules, it excels in the ability to cause alignment of liquid crystal, enjoys high productivity, and suits utility as an aligning film for liquid crystal.

When the monomolecular film or the built-up film is formed of a long-chain alkylamine salt of polyamic acid and the film is subjected to an aftertreatment for liberation of the long-chain alkylamine, there is produced a macromolecular aligning film of high reliability which has high resistance to heat and does not suffer any deterioration of the ability thereof to cause alignment even in an environment of high temperature or high temperature and high humidity. Since this macromolecular aligning film possesses a characteristic quality to withstand amply the heating to be made as in the sealing of the outer periphery during the manufacture of liquid crystal cells, it makes a highly suitable aligning film for liquid crystal.

EXAMPLE 12:

To a 1 m mol/l solution of polyamic acid synthesized from pyromellitic dianhydride and 4,4-diaminodiphenyl ether in a mixed solvent (1:1) of N,N-dimethylacetamide and benzene, a solution of N,N-dimethyl-n-hexadecylamine dissolved in the same concentration in the same solvent as described above was added in an amount of two equivalent weights based on the repeating unit of the polyamic acid, to prepare a solution of the alkylamine salt of polyamic acid. This solution was dropped onto ion-exchanged water held in a water tank and, with the surface pressure kept at 25 dynes/cm by means of a partition disposed in the water bath, a glass substrate having undergone a treatment for impartation of hydrophobicity was moved up and down perpendicularly to the surface of the water, to form a 10-fold built-up film on the substrate.

The treatment for impartation of hydrophobicity was carried out by immersing the glass substrate in a 1% solution of trimethylchlorosilane in toluene for five hours and then washing and drying the immersed substrate.

By the test for absorption of polarized UV, the built-up film of polyamic acid formed by the method described above were found to have the main chains of the macromolecules thereof aligned perpendicularly to the direction of the pulling up of the substrate.

Then, the substrate on which the built-up film had been formed was kept immersed in a mixed solution of acetic anhydride-pyridine-benzene (1:1:3) for release of the long-chain alkyl group and perfect imidation. The substrate after the immersion was washed with pure water and vacuum-dried. Similarly, the built-up film of the polyimide were also confirmed to have the main chains aligned perpendicularly to the direction of the pulling up of the substrate.

EXAMPLE 13:

On the outer periphery of the substrate obtained in Example 12, an epoxy type adhesive containing spacer beads of 20 μm in diameter was applied by printing. The substrate prepared as described above and an opposite substrate which had similarly undergone a treatment for alignment are applied to each other in such a manner that the respective directions of the pulling up fell anti-parallel to each other. Then, a mixture of a biphenyl type liquid crystal (nematic liquid crystal) produced by BDH and marketed under product code of "E7" and a dichroic dye produced by BDH and marketed under product code of "D37" (D37: 1.3%) was injected by the vacuum sealing method into the space intervening between the opposed substrates via the gap formed in advance in the adhesive layer. Thus, there was obtained a guest-host type liquid crystal cell.

It was confirmed that in this cell, the liquid crystal was uniaxially aligned in the direction of the pulling up of the substrate and that the condition of this alignment was uniform.

For evaluation of the ability to effect alignment, the ratio $(A\|:A\perp)$ of the absorbance $(A\|)$ of polarized light parallel to the direction of the pulling up of the substrate and the absorbance $(A\perp)$ of polarized light perpendicular to the same direction, each at 550 nm (absorption peak of the aforementioned dichroic pigment), was calculated. This ratio was found to be as high as 6.0. This value was virtually the same throughout the entire region within the cell.

EXAMPLE 14:

A liquid crystal cell was obtained by following the procedures of Example 12 and Example 13, except that a polyamic acid synthesized from pyromellitic dianhydride and p-phenylenediamine was used instead. The cell showed a similarly high ability to effect alignment.

REFERENTIAL EXPERIMENT:

A 2% solution of the same polyamic acid as used in Example 12 in N-methyl pyrrolidone was applied by the spin coating method on a glass sheet and heat-treated at 120° C. for 30 minutes and then at 270° C. for one hour. This substrate was rubbed in one direction with a cotton cloth for alignment.

Then, a cell was, as in Example 13, formed by joining two such substrates in a manner such that the directions of the rubbing fell anti-parallel to each other. In this cell, the ratio $(A\|:A\perp)$ of the absorbance $(A\|)$ of polarized light parallel to the direction of the rubbing and the absorbance $(A\perp)$ of polarized light perpendicular to the same direction was calculated. This ratio was found to be 6.0. This ratio implies that the ability to effect alignment was the same as that of Example 13.

The results evince that the aligning film according to the present modification excels in the ability to effect alignment of liquid crystal.

PART V

Finally, as the fourth modification of the basic liquid crystal element of the present, the modification in the liquid crystal will be described below. This modification resides in using, in the basic liquid crystal element of this invention or in the liquid crystal element embodying the aforementioned first or second and/or third modification, a ferroelectric liquid crystal as the liquid crystal.

In other words, the present modification is directed to, for example, a liquid crystal element comprising opposed substrates, a liquid crystal nipped between the opposed substrates, and an aligning film formed on the surface of at least one of the opposed substrates and adapted to align the liquid crystal molecules substantially horizontally relative to the surface of the substrate, which liquid crystal cell is characterized by the fact that the molecules forming the aforementioned aligning film are substantially aligned and further that the liquid crystal is a ferroelectric liquid crystal.

Of course, even in the ferroelectric liquid crystal element, the liquid crystal is required to be aligned.

As conventional means for effecting alignment, oblique evaporation of an inorganic substance, and rubbing of an applied layer of a silane coupling agent or an organic macromolecular substance have been known. None of these methods is fully satisfactory. The oblique evaporation of an inorganic substance consumes much time and suffers from poor productivity because it consists in a batchwise treatment. The method which comprises rubbing the applied layer of a silane coupling agent is deficient in reliability.

In the case of the method which produces an aligning film by rubbing an applied layer of an organic macromolecular substance, the produced aligning film often suffers from poor resistance to heat. Even the polyimide which offers highly satisfactory resistance to heat and finds popular acceptance has the following drawbacks.

(1) The color which the polyimide assumes degrades the quality of thepicture to be displayed.
(2) The action of rubbing exerted on the polyimide forces this polymer to suffer from such inconveniences as adhesion of dust, for example.
(3) The polyimide manifests an ability to memorize information only with difficulty.

Particularly when the liquid crystal to be used is of the ferroelectric type, since the cell gap of a liquid crystal cell is small (not more than about 3 μm, for example), the polyimide is susceptible of such inconveniences as adhesion of dust due to the action of rubbing and adverse effects of the lack of uniformity of the thickness of the applied aligning film. Moreover, the inability of the polyimide to make use of the ability of memory inherent in the ferroelectric liquid crystal constitutes a serious drawback.

This modification aims to provide a ferroelectric liquid crystal element which has safely undergone the treatment of alignment without entailing adhesion of dust and which possesses a stable ability of memory.

Of course, the liquid crystal cell of the present modification can be configurated as illustrated in FIG. 1. In this case, a ferroelectric liquid crystal is used as the liquid crystal 33. It is also permissible to use as the liquid crystal a ferroelectric liquid crystal incorporating therein a dichroic dye.

When the aligning film having the molecules of its own component substance aligned as contemplated by the present modification is adopted, the treatment of rubbing is no longer necessary and the otherwise inevitable occurrence of dust due to the rubbing action can be avoided. Even with the ferroelectric liquid crystal element which, owing to the small cell gap, is susceptible of the influence of dust, therefore, improvement of the quality of display and improvement of the yield can be realized by the present modification. Further, while the conventional method resorting to the rubbing action has experienced hindrance in the increase of surface area of the liquid crystal display element owing to the difficulty in the uniformization of load during the course of rubbing action, the present invention easily realizes this increase of the surface area because it has no use for the rubbing action.

The ferroelectric liquid crystal element of the kind which requires an applied layer of polyimide to be rubbed for alignment has manifested an ability of memory only with difficulty.

In contrast, the present modification permits manifestation of an ability of memory even when a polyimide film is used as an aligning film.

EXAMPLE 15:

On a glass sheet, a two-fold built-up film was formed by Langmuir-Brodgett's technique using a 1:1 mixture of benzene and N,N-dimethylacetamide containing a small amount of an alkylamine salt of polyamic acid. As the alkylamine salt of polyamic acid, N,N-dimethyl-n-hexadecylamine salt of polyamic acid synthesized from 3,4,3′,4′-biphenyltetracarboxylic dianhydride and p-phenylenediamine was used. On the substrate, a transparent electrode of ITO was superposed in advance.

Then, the substrate on which the built-up film had been formed as described above was kept immersed in a 1:1:3 mixed solution of acetic anhydride, pyridine, and benzene at room temperature for six hours for thorough imidation, to obtain an aligning polyimide film.

Plastic beads of 2.0 $\mu$m in diameter were scattered as a gapping material on the aforementioned substrate and a ferroelectric liquid crystal produced by Chisso Corporation and marketed under product code of "CS1011" was nipped between this substrate and another similar substrate, to complete a liquid crystal cell. In this case, the two substrates were disposed in such a manner that their respective directions of the pulling up were set either parallel or anti-parallel.

When this cell was heated to 95° C. and then cooled at a temperature decreasing rate of about 1° C./min., uniform alignment was obtained throughout the entire volume of the cell.

When this cell was nipped and rotated between two polarizing plates disposed in the cross Nicol pattern, it was darkened as the direction of polarization of the polarizing plates and the direction of the pulling up of the substrate fell parallel to each other or formed an angle of 90° and brightened as the two directions formed an angle of 45°. This fact evinces that the molecules of the ferroelectric liquid crystal were aligned substantially in the direction of the pulling up of the substrate.

When a voltage of ±10 V was applied between the electrodes of the upper and lower substrates, the liquid crystal in the portions of the electrodes uniformly responded. The response time at room temperature was about 1 ms. In this arrangement which produced the largest contrast, the angle formed between the direction of the pulling up and the direction of polarization of the polarizing plates was in the range of 19° to 20°.

The portions of the electrodes retained their state intact even when the voltage between the electrodes was changed to 0 V, indicating that the cell possessed an ability of memory. The ratio of light transmittance between the ON part and the OFF part was about 40:1 500 hours after the input.

When a similar liquid crystal cell was prepared by the method requiring an applied layer of polyimide to be rubbed for alignment, uniform alignment was obtained and the response time was practically the same as that of the preceding example. The cell, however, failed to acquire an ability for memory.

EXAMPLE 16:

A liquid crystal cell was produced by following the procedure of Example 15, except that aluminum beads of 2.2 $\mu$m in diameter were used as a gapping material, a ferroelectric liquid crystal produced by Chisso Corporation and marketed under product code of "CS1014" was used and a temperature decreasing rate of 0.5° C./min. was employed, instead. Again in this case, highly satisfactory characteristics were obtained. The response time was 700 $\mu$s. The angle formed between the direction of polarization of the polarizing plates and the direction of the pulling up of the substrate to give the largest contrast was about 20° to 21°.

Incidentally, some further brief explanation of the drawing will be given, as follows. In FIG. 3, the solid line is for a liquid crystal cell according to the present invention, while the broken line is for a liquid crystal cell for which the aligning film was prepared by the rubbing method.

What is claimed is:

1. In a process of producing a liquid crystal element comprising opposed substrates, a liquid crystal nipped between said opposed substrates, and an aligning film formed on the surface of at least one of said substrates to effect substantially horizontal alignment of the liquid crystal molecules relative to said surface, the improvements which comprise forming said aligning film by (a) the Langmuir-Brodgett's technique, comprising transferring said amphipathic substance spread on a subphase onto said substrate surface, whereby a monomolecular or multimolecular layer of said amphipathic substance is directly formed as said aligning film on said substrate surface or (b) the Langmuir-Brodgett's technique, comprising transferring an amphipathic substance spread on a subphase onto said substrate surface, whereby a monomolecular or multimolecular layer of said amphipathic substance is formed on said substrate surface, followed by converting in situ of said amphipathic substance forming the resulting monomolecular or multimolecular layer thereof to the corresponding nonamphipathic substance as said aligning film.

2. The improvements according to claim 1, wherein said monomolecular or multimolecular layer of a nonamphipathic substance as said aligning film is a monomolecular or multimolecular polyimide layer and the corresponding precursor amphipathic substance for the polyimide is an amphipathic polyimide precursor.

3. The improvements according to claim 1, wherein said aligning film is made of a macromolecular substance.

4. The process according to any one of claims 1-3, wherein said liquid crystal is a ferroelectric liquid crystal.

* * * * *